Dec. 16, 1952     S. A. YOUNG     2,621,890

EXPOSED VALVE STRUCTURE WITH REMOVABLE STOP WASHER

Filed July 23, 1948

INVENTOR.
STEPHEN A. YOUNG.
BY
Lockwood, Goldsmith & Galt
ATTORNEYS.

Patented Dec. 16, 1952

2,621,890

UNITED STATES PATENT OFFICE 2,621,890

EXPOSED VALVE STRUCTURE WITH REMOVABLE STOP WASHER

Stephen A. Young, Delphi, Ind.

Application July 23, 1948, Serial No. 40,393

4 Claims. (Cl. 251—152)

This invention relates to a valve structure for sinks, lavatories, bidets and baths.

The chief object of this invention is to provide a valve structure for so-called exposed valves which shut off with pressure.

The chief feature of the invention relates to the pressure exposed seat member and a locking or stop washer, both operatively associated with a so-called exposed and readily removable stem.

Other objects and features of the invention will be set forth more fully hereinafter.

The full nature of the invention will be understood from the accompanying drawings and the following description and claims:

In copending application Serial No. 781,230 filed October 21, 1947, now Patent No. 2,591,991, entitled Exposed Mixing Chamber, Mask, Retainer and Valve Control Assembly, there is disclosed a mask applied to a sanitary fixture and the valve sleeve is locked thereto by the concealed lock nut concealed by the bonnet nut. Since this feature is not claimed herein same (sanitary fixture) is not shown herein. However, the valve structure herein disclosed may be used as illustrated in said application.

The present application is a continuation in part of said pending application. The present application also is a continuation in part of application Serial No. 10,977 filed February 26, 1948, and entitled Diverter Valve and Mixing Chamber Unit. However, therein the valve shuts off against pressure while the present invention shuts off with the pressure.

Figure 1:
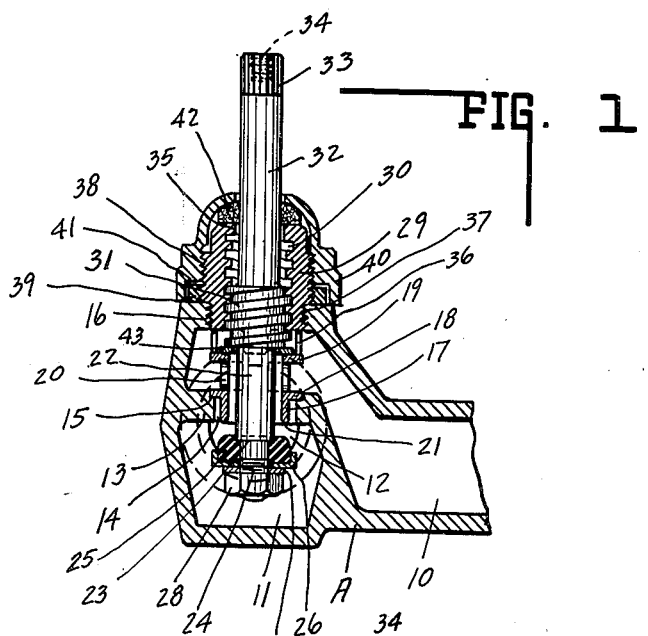
Fig. 1 is a central sectional view through one embodiment of the invention applied to a mixing chamber structure, the valve being shown in open position.
Figure 2:
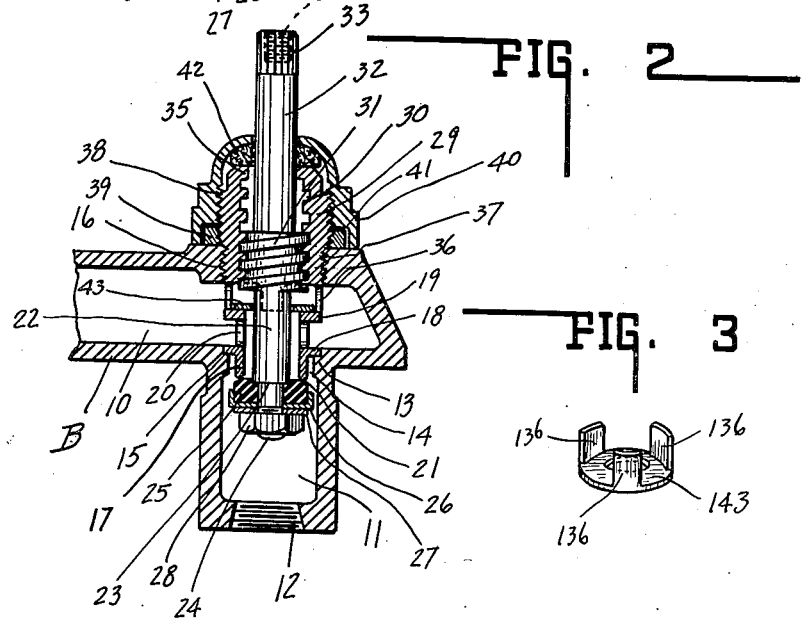
Fig. 2 is a similar view of a slightly different form of mixing chamber, the valve being shown in closed position.

Since in the two figures of the instant drawings the mixing chamber only differs, that in Fig. 1 is designated A and that in Fig. 2 is designated B. In parts A and B 10 indicates the valve controlled chamber, 11 the pressure supply chamber, 12 the pressure supply connection, 13 the seat supporting flange having opening 14 providing communication between chambers 10 and 11. The downstream side is recessed at 15. Opposite same the fixture includes threaded hole 16.

Reference will now be had to the valve per se and its seat. The seat comprises a sleeve 17 with spaced flanges 18 and 19. Therebetween the sleeve is laterally ported as at 20. The sleeve projects beyond flange 18 and terminates in the rounded seat edge 21. Flange 18 seats in recess or counterbore 15.

The stem 22 includes shoulder 23 and the reduced end 24 is threaded. Upon this end and bearing upon shoulder 23 is annular valve seat washer 25 carried by cup 26 bearing on washer 27. Nut 28 locks the aforesaid to the stem end and against shoulder 23. The aforesaid is of slightly lesser diameter than opening 14.

A sleeve 29 is internally coarse threaded at 30 to take coarse thread 31 on stem 22. The upper end 32 thereof is smooth except at the free end 33 which is grooved as shown and tapped as at 34. Sleeve 29 includes internal collar 35 at the upper end and spacing extensions 36 at the inner or lower end as shown.

The sleeve 29 has two external diameters and the lower is the smaller. The lower end is externally threaded at 37 to thread into threaded hole 16 for sleeve mounting and trapping of the sleeve seat member in its seat 15.

The upper end is externally threaded at 38 to take sanitary fixture anchoring nut 39 and bonnet nut 40 recessed at 41 to nest the former. Bonnet washer 42 is interposed between sleeve 29, stem 32 and nut 40.

Disposed upon stem 22 between coarse thread portion 31 and flange 19 is a stop washer 43. This prevents the stem from excessively dropping down through the valve seat member upon valve opening movement. The washer is removable so that a thicker or thinner stop washer may be provided so as to regulate the extent of movement of the stem into opening position. Upon valve closing the same seat member is retained by sleeve extension 36. Were it not for the extension 36 water pressure might elevate said member sufficient for water to escape between the said member below flange 18 thereof and the partition wall 13.

Thus the valve seat member is locked in position but may be withdrawn any time sleeve 29 is removed and therewith. Also the stem and valve is locked to the sleeve and cannot be separated except by removing sleeve 29. It then can be separated by unscrewing the coarse thread and withdrawing the stem in the valve opening direction or by removing the nut 28, washer 27, cup 26 and valve seat washer 25 and then withdrawing the stem in the valve closing direction relatively speaking.

Figure 3:
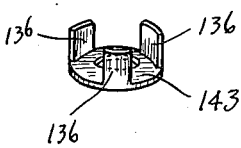
Fig. 3 is a perspective view of a modified form of stop washer.

In Fig. 3 of the drawings a modified form of stop washer is illustrated. Herein washer 143 at its periphery includes extensions 136. In such cases sleeve 29 is devoid of extensions 36. This form of washer can thus be furnished in varying heights to compensate for variations in threaded engagement of the sleeve member.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims:

The invention claimed is:

1. In a valve structure of the seating with pressure type, a fixture body, a coarse threaded valve stem, the coarse thread having the greatest stem diameter, said stem being mounted in an externally threaded sleeve like body threaded into the fixture body and externally removable therefrom by unthreading, and a valve seat washer carried by the inner end of the stem and of larger external diameter than the stem, the combination therewith of a tubular valve seat member seated in said fixture body, said seat member surrounding the stem between the coarse thread thereof and the seat member, the diameter of the seat member being greater in cross-sectional area than that of the stem contiguous thereto, and a removable stop washer upon said stem between the seat member and the coarse thread upon the stem.

2. In a valve structure of the seating with pressure type, a fixture body, a coarse threaded valve stem, the coarse thread having the greatest stem diameter, said stem being mounted in an externally threaded sleeve like body threaded into the fixture body and externally removable therefrom by unthreading, and a valve seat washer carried by the inner end of the stem and of larger external diameter than the stem, the combination therewith of a tubular valve seat member seated in said fixture body, said seat member surrounding the stem between the coarse thread thereof and the seat member, the diameter of the seat member being greater in cross-sectional area than that of the stem contiguous thereto, the sleeve like body including means for securing the valve member in position against pressure when the valve is closed, and a removable stop washer upon said stem between the seat member and the coarse thread upon the stem.

3. In a valve structure of the seating with pressure type, a fixture body, a coarse threaded valve stem, the coarse thread having the greatest stem diameter, said stem being mounted in an externally threaded sleeve like body threaded into the fixture body and externally removable therefrom by unthreading, and a valve seat washer carried by the inner end of the stem and of larger external diameter than the stem, the combination therewith of a tubular valve seat member seated in said fixture body, said seat member surrounding the stem between the coarse thread thereof and the seat member, the diameter of the seat member being greater in cross-sectional area than that of the stem contiguous thereto, the sleeve like body including means for securing the valve member in position against pressure when the valve is closed and the tubular seat member comprises a pair of spaced flanges spaced from the valve seat portion thereof, said member between flanges having a lateral port therethrough, and a removable stop washer upon said stem between the seat member and the coarse thread upon the stem.

4. In a valve structure of the seating with pressure type, a fixture body, a coarse threaded valve stem, the coarse thread having the greatest stem diameter, said stem being mounted in an externally threaded sleeve like body threaded into the fixture body and externally removable therefrom by unthreading, and a valve seat washer carried by the inner end of the stem and of larger external diameter than the stem, the combination therewith of a tubular valve seat member seated in said fixture body, said seat member surrounding the stem between the coarse thread thereof and the seat member, the diameter of the seat member being greater in cross-sectional area than that of the stem contiguous thereto, a stop washer upon said stem between the seat member and the coarse thread upon the stem, and means integral with the said stop washer and intermediate the threaded sleeve like body and the valve seat member for valve seat member position retention when subjected to pressure and the valve is closed.

STEPHEN A. YOUNG.

REFERENCES CITED

The following references are of record in the file of this patent:

UNITED STATES PATENTS

| Number | Name | Date |
| --- | --- | --- |
| 566,432 | Whittaker | Aug. 25, 1896 |
| 949,115 | Davey | Feb. 15, 1910 |
| 951,407 | Moore | Mar. 8, 1910 |
| 976,908 | Payne | Nov. 29, 1910 |
| 1,526,921 | McNamara | Feb. 17, 1925 |
| 1,707,630 | Erceg | Apr. 2, 1929 |
| 1,762,178 | Lear | June 10, 1930 |
| 1,856,088 | Brown | May 3, 1932 |